United States Patent
Caruel

(10) Patent No.: US 9,003,770 B2
(45) Date of Patent: Apr. 14, 2015

(54) NACELLE REAR ASSEMBLY FOR TURBOJET ENGINE

(75) Inventor: Pierre Caruel, Le Havre (FR)

(73) Assignee: Aircelle, Gonfreville l'Orcher (FR)

(*) Notice: Subject to any disclaimer, the term of this patent is extended or adjusted under 35 U.S.C. 154(b) by 930 days.

(21) Appl. No.: 12/601,049

(22) PCT Filed: Mar. 28, 2008

(86) PCT No.: PCT/FR2008/000431
§ 371 (c)(1),
(2), (4) Date: Nov. 20, 2009

(87) PCT Pub. No.: WO2008/142242
PCT Pub. Date: Nov. 27, 2008

(65) Prior Publication Data
US 2010/0146933 A1    Jun. 17, 2010

(30) Foreign Application Priority Data
May 22, 2007    (FR) .................................. 07 03607

(51) Int. Cl.
*F02K 1/64*    (2006.01)
*B64D 29/08*    (2006.01)
*B64D 29/00*    (2006.01)
(Continued)

(52) U.S. Cl.
CPC ............... *B64D 29/08* (2013.01); *B64D 29/00* (2013.01); *B64D 33/04* (2013.01); *F01D 25/24* (2013.01); *F02K 1/78* (2013.01); *F02K 1/80* (2013.01); *F05D 2240/14* (2013.01)

(58) Field of Classification Search
USPC .......... 60/226.1, 226.2, 226.3, 796, 797, 798; 244/12.5, 53 B, 53 R, 54, 110 B, 129.4, 244/129.5; 137/15.1; 239/265.23, 265.27, 239/265.31; 248/554; 49/142, 143, 394, 49/395
See application file for complete search history.

(56) References Cited

U.S. PATENT DOCUMENTS 3,059,426 A * 10/1962 Laucher et al. .......... 239/265.31
4,037,809 A *  7/1977 Legrand ......................... 244/54
(Continued)

FOREIGN PATENT DOCUMENTS

EP    0361901 A1    4/1990
EP    1515006 A1    3/2005
(Continued)

OTHER PUBLICATIONS

International Search Report PCT/FR2008/000431; Dated Nov. 21, 2008.

*Primary Examiner* — Phutthiwat Wongwian
*Assistant Examiner* — Michael B Mantyla
(74) *Attorney, Agent, or Firm* — Brinks Gilson & Lione

(57) ABSTRACT

The invention relates to a nacelle rear assembly for a turbojet engine, that comprises: a hood, an inner structure in the shape of a sheath in which at least the rear portion (15) is of the O-duct type and is capable of axial sliding between an operational position in which it covers the gas generator (3) of said turbojet engine and defines an annular cold-air jet with said hood, and a maintenance position downstream from said operational position. The downstream portion (15) is conformed so as to be capable of sliding without blocking relative to said gas generator (3), and the inner structure includes an upstream portion (13) that can be separated from the downstream portion (15) and that includes at least two doors (13a, 13b) capable of opening towards the outside.

9 Claims, 3 Drawing Sheets

(51) Int. Cl.
*B64D 33/04* (2006.01)
*F01D 25/24* (2006.01)
*F02K 1/78* (2006.01)
*F02K 1/80* (2006.01)

(56) References Cited

U.S. PATENT DOCUMENTS

| | | | | |
|---|---|---|---|---|
| 4,073,440 | A * | 2/1978 | Hapke | 239/265.29 |
| 4,825,648 | A * | 5/1989 | Adamson | 60/226.1 |
| 5,228,641 | A | 7/1993 | Remlaoui | |
| 5,350,136 | A * | 9/1994 | Prosser et al. | 244/129.4 |
| 5,518,206 | A * | 5/1996 | Arnold et al. | 244/129.4 |
| 5,524,847 | A * | 6/1996 | Brodell et al. | 244/54 |
| 5,603,471 | A * | 2/1997 | Armstrong | 244/53 R |
| 5,755,403 | A * | 5/1998 | Marche | 244/54 |
| 6,334,588 | B1 * | 1/2002 | Porte | 244/129.4 |
| 6,516,606 | B2 * | 2/2003 | Fournier et al. | 60/262 |
| 6,568,172 | B2 * | 5/2003 | Jannetta et al. | 60/226.2 |
| 7,255,307 | B2 * | 8/2007 | Mayes | 244/129.5 |

FOREIGN PATENT DOCUMENTS

| | | |
|---|---|---|
| FR | 2291091 | 11/1974 |
| FR | 2772342 | 6/1999 |
| GB | 2274490 | 7/1994 |
| GB | 2288578 | 10/1995 |

* cited by examiner

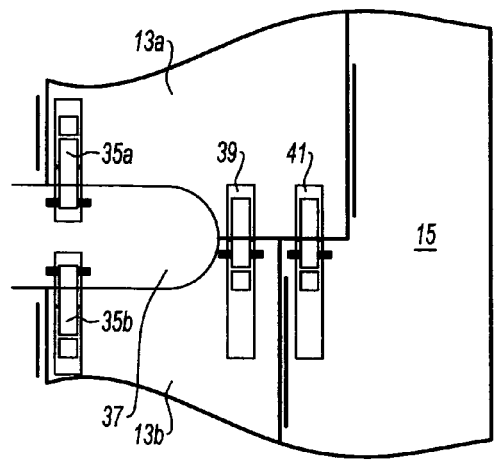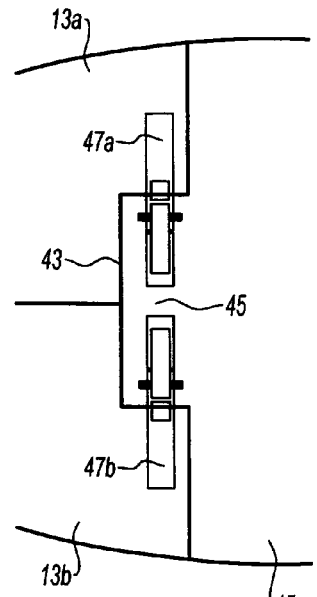
Fig. 7      Fig. 8
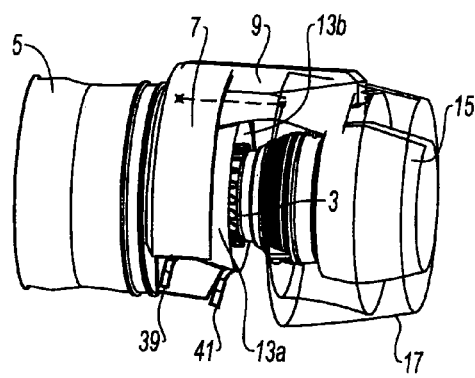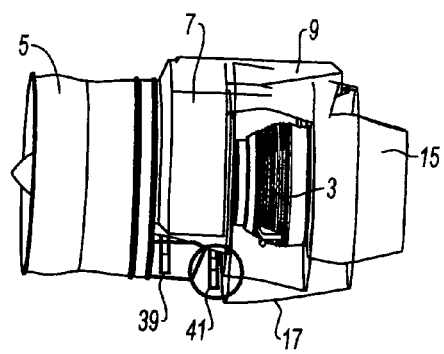
Fig. 9      Fig. 10
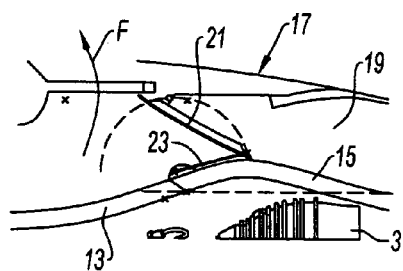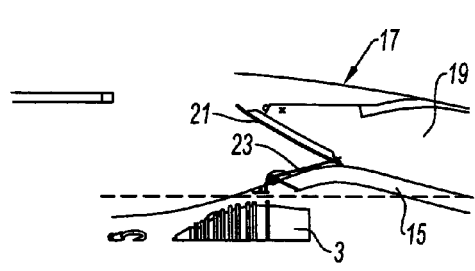
Fig. 11      Fig. 12

NACELLE REAR ASSEMBLY FOR TURBOJET ENGINE

TECHNICAL FIELD

The present invention relates to a nacelle rear assembly for a turbojet engine, and to a nacelle equipped with such an assembly.

BRIEF DISCUSSION OF RELATED ART

An airplane is propelled by one or more turbojet engines each housed in a nacelle.

A nacelle generally has a tubular structure comprising an air inlet upstream of the turbojet engine, an intermediate assembly intended to surround a fan of the turbojet engine, a rear assembly that may incorporate thrust reversal means and is intended to surround the combustion chamber and all or part of the turbojet engine turbine and compressor stages and generally ends in a jet pipe the outlet of which is situated downstream of the turbojet engine.

Modern nacelles are intended to house a bypass turbojet engine capable of generating, on the one hand, a stream of hot air (also known as the primary stream) that comes from the combustion chamber of the turbojet engine and, on the other hand, a stream of cold air (the secondary or bypass stream) that comes from the fan and flows around the outside of the turbojet engine through an annular passage also known as a flow path that is formed between an internal structure that defines a fairing of the turbojet engine and an internal wall of the nacelle. The two airstreams are ejected from the turbojet engine via the rear of the nacelle.

The thrust reversal means make it possible, when an airplane is landing, to improve the ability of the latter to brake by redirecting forward at least part of the thrust generated by the turbojet engine. In this phase, the reverser generally closes off the cold stream flow path and directs this stream toward the front of the nacelle, thereby generating a reverse thrust which adds to the braking effect of the wheels of the airplane.

The means employed to achieve this reorientation of the cold stream vary according to the type of reverser.

The art discloses a nacelle rear assembly for a turbojet engine comprising:
 a cowl,
 a pod-shaped internal structure of which at least the downstream part is of the O-duct type and is able to move in axial sliding between an operating position in which it covers the gas generator of said turbojet engine and defines an annular cold air flow path with said cowl, and a maintenance position situated downstream of said operating position.

The expression "pod-shaped" means that the internal structure has a central region of a larger diameter than its upstream and downstream ends.

The expression "O-duct", commonly used in the field of airplane nacelles, means that the member concerned (in this instance the downstream part of the internal structure) extends over practically the entire circumference of the gas generator of the airplane.

This expression is used to contrast with "C-duct" which denotes a member which extends over only half the circumference of the gas generator (in such instances the member is also said to be "half-shell".

By definition, an "O-duct" member can provide access to the gas generator only by axial sliding.

In practice, an "O-duct" internal structure will strike the gas generator of the airplane as it slides from its operating position to its maintenance position: the downstream movement of the internal structure is thus limited which means that certain members of the gas generator can be accessed only by providing access hatches in this member.

BRIEF SUMMARY

The disclosure provides a nacelle rear assembly of the aforementioned type that facilitates access to the turbojet engine.

More particularly, the disclosure provides a nacelle rear assembly for a turbojet engine comprising:
 a cowl,
 a pod-shaped internal structure of which at least the downstream part is of the O-duct type and is able to move in axial sliding between an operating position in which it covers the gas generator of said turbojet engine and defines an annular cold air flow path with said cowl, and a maintenance position situated downstream of said operating position, the upstream part of said internal structure being detachable from said downstream part and comprising at least two doors capable of opening outward,
 this assembly being notable in that the inside diameter of the upstream edge of said downstream part is greater than the largest diameter of said gas generator, so that this downstream part can slide without blockage in relation to this gas generator.

As may be appreciated, an assembly such as this allows the upstream part of the internal structure to be separated from the downstream part, and allows this downstream part to be slid without blockage in relation to the low pressure turbine casing of the gas generator in particular.

It is therefore possible in this way to break free of the constraint whereby the upstream part butts against the gas generator on account of this upstream part having too small a diameter.

Whereas access to the downstream part of the gas generator is obtained by sliding the downstream part of the internal structure, access to the upstream part of the gas generator is obtained by opening the doors of the upstream part of the internal structure outward.

According to other optional features of the nacelle rear assembly according to the invention:
 said doors can open by pivoting about axes substantially parallel to the direction of said sliding: such a method of opening is technically very simple to implement;
 said doors are also able to move in axial sliding: this makes it possible, once the doors have been opened, for these doors to be moved toward the downstream end of the gas generator, if they have not been opened sufficiently to provide access to the upstream region of the gas generator (see, in particular, hereinafter the case where a forward frame covers the doors);
 this assembly comprises peripheral means of connecting said doors to said downstream part, of the knife edge and groove type: such means of connection guarantee the robustness and fluid tightness of this connection, and make it possible to avoid any unwanted axial movement of the downstream part of the internal structure as long as the doors of the upstream part have not been opened;
 in the region where they close edge-to-edge, said doors exhibit an axial offset, at least a first catch being interposed in the region of the contiguous edges of said doors, and at least a second catch being interposed in the region where the edge of one of said doors is contiguous with the edge of said downstream part of the internal structure: such an axial offset makes it possible to prevent the two doors from locking as long as the downstream part of the internal structure has not been returned to its operating position;

in the region where they close edge-to-edge, said doors have a cutout capable of housing a protrusion of said downstream part of the internal structure, at least first and second catches being interposed between said doors and said protrusion: the role of this cutout and of this protrusion can be likened to that of the aforementioned offset;

when said cowl is itself mounted to slide axially between an operating position and a maintenance position situated downstream of said operating position, this assembly comprises catches providing the connection between said doors, the actuating handles of which are long enough to block the return of said cowl from its maintenance position to its operating position as long as these handles are not folded down into the locked position: this makes it possible to guard against closure of the cowl when the two doors are not correctly locked;

this assembly comprises a forward frame able to be connected to the fan casing of said turbojet engine, this forward frame at least partially covering said doors when said internal structure is in the operating position;

said forward frame is structural to said nacelle;

this assembly comprises thrust reversal means;

said thrust reversal means comprise shutters pivot-mounted on said cowl, and links interposed between these shutters and said downstream part of the internal structure so that a translational movement of said cowl in the downstream direction causes these shutters to close off said cold air flow path and to deflect the cold air stream toward the outside of the nacelle.

The present invention also relates to an airplane nacelle, notable in that it is equipped with an assembly according to the foregoing.

BRIEF DESCRIPTION OF THE DRAWINGS

Other features and advantages of the present invention will become apparent in the light of the description which will follow, and from examining the figures appended hereto, in which:

FIG. 7 is a view from underneath of the internal structure of the nacelle rear assembly according to the invention, the two doors and the downstream part of this internal structure being depicted in the locked position, FIG. 8 is a view similar to that of FIG. 7, of an alternative form of the region of connection of the two doors and of the downstream part of the internal structure, FIG. 9 is a view similar to that of FIG. 4, the cowl of the nacelle rear assembly according to the invention being depicted in the maintenance position, FIG. 10 is a view similar to that of FIG. 9, said cowl being depicted in a position butting against catches of the doors of said internal structure, FIG. 11 is a view similar to that of FIG. 2, the thrust reversal means being depicted in an active position, and FIG. 12 is a view similar to that of FIG. 11, the thrust reversal means and the downstream part of the internal structure being depicted in the maintenance position.

DETAILED DESCRIPTION

Figure 1:
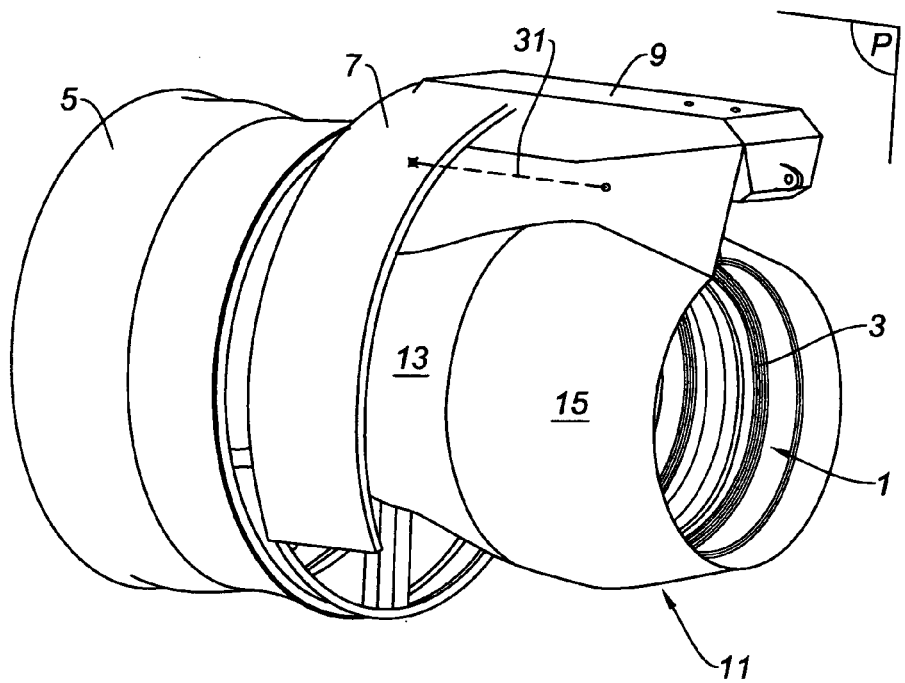
FIG. 1 is a perspective depiction of a turbojet engine on which a nacelle rear assembly according to the invention is mounted, the cowl of this rear assembly having been removed for the purposes of this explanation.
Figure 2:
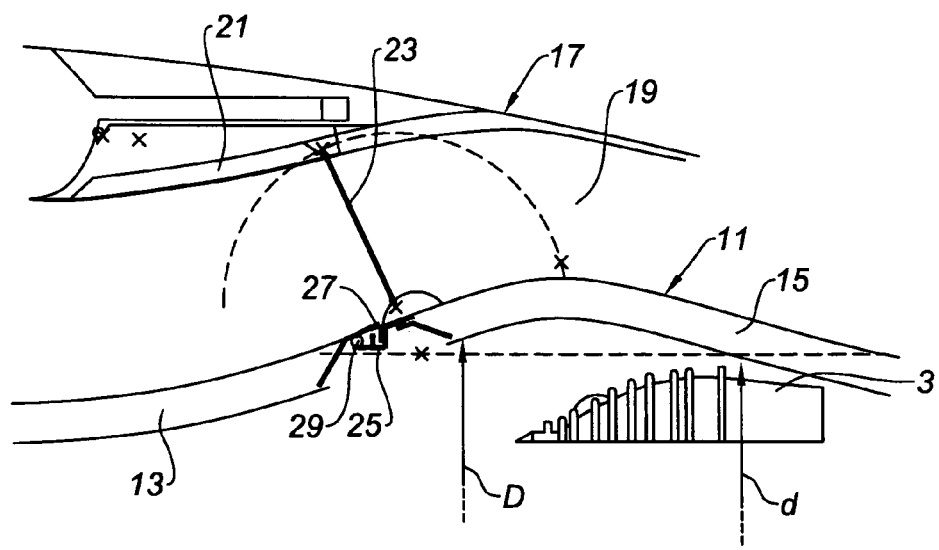
FIG. 2 is a view in axial section, taken on the plane P of FIG. 1, of part of the region contained between the internal structure and the cowl of the nacelle rear assembly according to FIG. 1.

Reference is now made to FIGS. 1 and 2 which depict an airplane turbojet engine 1 comprising in particular a gas generator 3, and, upstream thereof, a fan the casing 5 of which may be seen.

A forward frame 7, attached downstream of the fan casing 5, connects the engine 1 to a pylon 9 intended to be fixed under an airplane wing.

In this particular configuration, it is said that the forward frame 7 is structural, that is to say is able to bear the weight of the turbojet engine 1 assembly, and the thrust and reverse thrust forces generated by this turbojet engine.

It must be clearly understood that the present invention is not in any way limited to the presence of a structural forward frame such as this, and that any conventional means of attaching the turbojet engine 1 to the pylon 9 also falls within the scope of the present invention.

A nacelle internal structure 11, comprising an upstream part 13 and a downstream part 15, forms a fairing for the gas generator 3 and is connected to the pylon 9 by means that allow appropriate dynamics, as will be described later on.

The internal structure 11 defines, with a cowl 17, an annular cold air flow path 19 able to allow cold air generated by the fan to circulate toward the downstream end of the nacelle.

In the particular case depicted in FIG. 2, the cowl 17 comprises thrust reversal means, typically comprising a plurality of shutters 21 that can be actuated by links 23 as the cowl 17 slides relative to the internal structure 11.

As is particularly clearly apparent from FIG. 2, the contiguous edges of the upstream part 13 and of the downstream part 15 of the internal structure 11 comprise complementary means of connection, of the knife edge 27 and groove 25 type, together with at least one seal 29.

These connecting means 25, 27 axially block the upstream 13 and downstream 15 parts relative to one another.

Advantageously, the downstream part 15 is mounted to slide on the pylon 9 by virtue of rail and slide means depicted symbolically by the dotted line 31 visible in FIG. 1.

These rail and slide means 31 may possibly also allow the upstream part 13 of the internal structure 11 to slide once it is open.

This upstream part 13 in fact comprises two half-doors 13a, 13b capable of opening outward, that is to say away from the gas generator 3, by pivoting about respective axes positioned substantially parallel to the rail and slide means 31.

This particular structure of the upstream part 13 differs from that of the downstream part 15, the latter being of the "O-duct" type as defined in the preamble of the description, that is to say extending over practically the entire circumference of the gas generator 3.

FIGS. 3 to 6 indicate the dynamics involved in opening the internal structure 11 with a view to carrying out maintenance operations on the gas generator 3.

Figure 3:
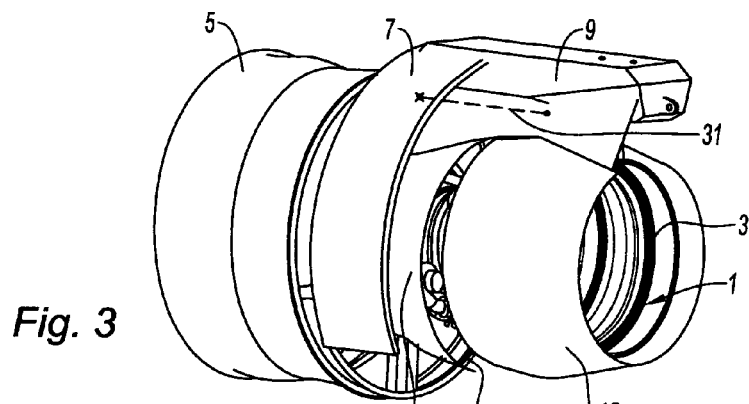
FIG. 3 is a view similar to FIG. 1, the two doors of the upstream part of the internal structure of the nacelle rear assembly being depicted in the open position.

To start off with, the two doors 13a, 13b of the upstream part 13 of the internal structure 11 are opened outward, as can be seen in FIG. 3.

In the example depicted, it may be seen that this outward opening is limited by the presence of the forward frame 7 which partially covers these doors.

In order to keep these doors in the open position, it is possible to envision the insertion of a retaining link 33 extending between the two lower edges of these doors.

Opening the two doors 13a, 13b allows the knife edges 27 of these two doors to leave the complementary groove 25 formed in the downstream part 15 of the internal structure 11.

Figure 4:
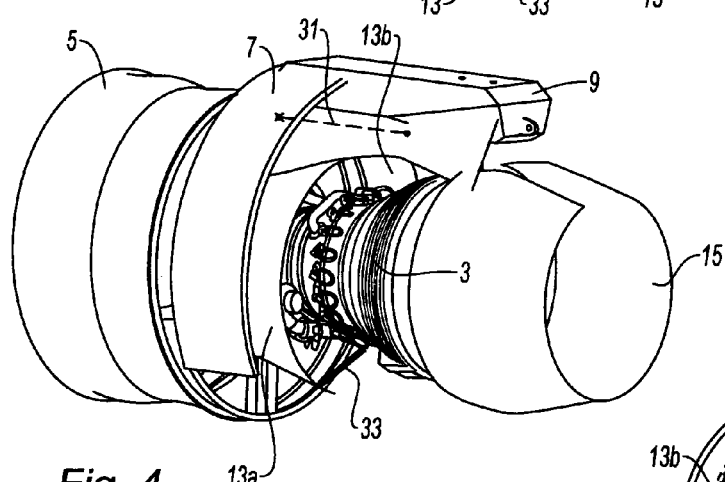
FIG. 4 is a view similar to FIG. 3, the downstream part of the internal structure being depicted in the maintenance position.
Figure 5:
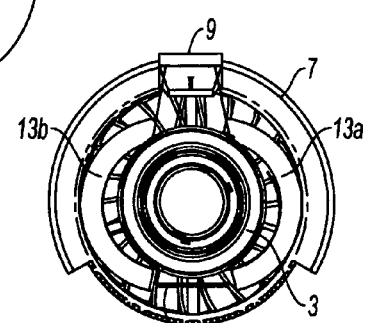
FIG. 5 is an axial view of the upstream part of the internal structure as depicted in FIG. 4, the downstream part having been omitted for clarity.

From there, the downstream part 15 can be slid downstream of the gas generator 3, as can be seen in FIG. 4, the two doors 13a and 13b remaining in the open position, as can be seen in FIG. 5.

In this maintenance configuration, it is therefore possible easily to access the downstream region of the gas generator 3, and a good proportion of its upstream region.

Figure 6:
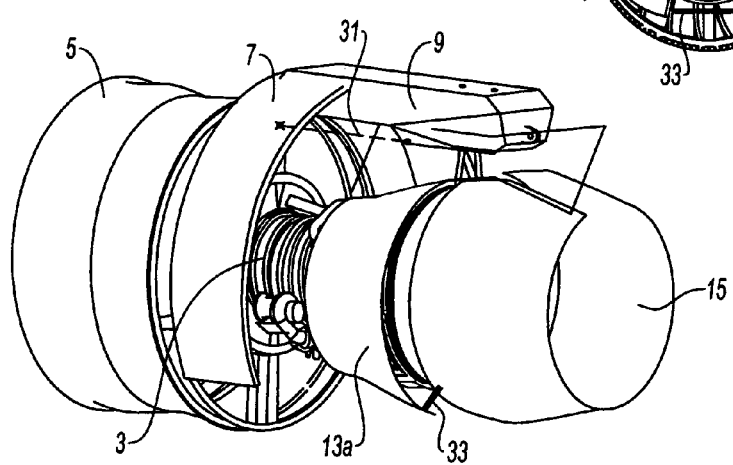
FIG. 6 is a view similar to FIGS. 3 and 4, the two doors of the upstream part of the internal structure and the downstream part of this internal structure having been slid toward the downstream end of the turbojet engine.

In the special case in which the two doors 13a, 13b are mounted to slide relative to the pylon 9, it is possible, starting out from the situation depicted in FIGS. 4 and 5, to slide these two open doors downstream, as is depicted in FIG. 6, making it possible to access the most upstream region of the gas generator 3.

It will be noted, as particularly visible in FIG. 2, that the inside diameter D of the upstream edge of the downstream part 15 is greater than the largest diameter of the gas generator 3, and it is thanks to this that this downstream part 15 can slide without blockage in relation to the low pressure turbine casing in particular.

With reference to FIG. 7, it may be seen that it is possible to provide, in the lower part of the two doors 13a, 13b, two catches 35a, 35b capable of allowing these two doors to be locked to a fixed part 37 of the engine (in particular allowing the running of pipes from the engine compartment to the fan compartment).

It can also be seen in FIG. 7 that provision is advantageously made for the two doors 13a, 13b to comprise asymmetric lower parts, that is in fact to say that the door 13a extends axially further downstream than the door 13b, the shape of the downstream part 15 for its part complementing the shape defined by the two doors 13a and 13b.

A first catch 39 is interposed between the door 13a and the door 13b, and a second catch 41 is interposed between the door 13a and the downstream part 15.

Thanks to the special arrangement of the catch 41, it will be appreciated that this catch cannot be closed again unless the downstream part 15 has been correctly returned to its operating position, that is to say such that the knife edges at the edges of the doors 13a and 13b have been engaged in the corresponding groove in the upstream edge of the part 15: this then makes it possible to guarantee that correct and full closure of the two doors 13a and 13b can be obtained only on the proviso that the downstream part 15 of the internal structure 11 has been correctly repositioned.

In the alternative form shown in FIG. 8, it may be seen that the lower part of the two doors 13a, 13b comprises a cutout 43 intended to collaborate with a complementary protrusion 45 formed on the lower part of the upstream edge of the downstream part 15. Two catches 47a, 47b are interposed respectively between the door 13a and the downstream part 15, and between the door 13b and this downstream part.

It will therefore be appreciated that, in this particular case, simultaneous closure of the two catches 47a, 47b can be obtained only on the proviso that the protrusion 45 has been correctly engaged in the cutout 43, that is to say that the downstream part 15 of the internal structure 11 has been correctly repositioned in its operating position: as long as this position has not been reached, it will not be possible for the two doors 13a, 13b to close correctly.

With reference to FIGS. 9 and 10, it can be seen that the cowl 17 can itself be mounted to slide on the pylon 9 between an operating position (not depicted) in which it at least partially covers the forward frame 7, and a maintenance position (see FIGS. 9 and 10) in which this cowl provides access to the gas generator 3.

As can be seen in FIGS. 9 and 10, provision may advantageously be made for the catches 39 and 41 of FIG. 7 to have enough of a radial extension that they block the return of the cowl 17 to its operating position unless they have been folded over and locked in their closed position: as can be seen in FIG. 10 in particular, the cowl 17 butts at least against the catch 41 when the latter is in its open position, the presence of the fixed structure 37 (see FIG. 7) preventing the handle of the catch 41 from twisting or breaking.

This particular safety device makes it possible to prevent any omission to lock the doors 13a, 13b prior to repositioning the cowl 17 in its operating position.

FIG. 11 depicts the thrust reversal shutters 21 in an active position, obtained by sliding the cowl 17 downstream of the internal structure 11, by virtue of which the cold air stream flowing through the flow path 19 is deflected toward the outside of the nacelle, as has been indicated by the arrow F.

In FIG. 12 it can be seen that the maintenance configuration that provides access to the gas generator 3 can be deduced from the configuration visible in FIG. 11 by sliding the downstream part 15 of the internal structure 11 jointly with the cowl 17 positioned in the thrust reversal mode.

As can be understood from studying FIGS. 2, 11 and 12, the fact that the downstream part 15 of the internal structure 11 is designed to be mounted such that it can slide relative to the pylon 9 makes it possible to envision actuating the shutters 21 using links 23 interposed between these shutters and the downstream part 15.

Such a method of actuation, which is extremely simple because it can be activated simply by the relative movement of the cowl 17 in relation to the downstream part 15, is not conceivable in other systems of the prior art in which, for example, the internal structure of the nacelle is formed as two half-shells capable of parting from the gas generator by pivoting.

As will have been appreciated from the foregoing, contriving for the internal structure 11 to comprise a downstream part 15 capable of sliding and an upstream part comprising two doors 13 capable of opening outward, makes it possible to open access to all the parts of the gas generator 3, and to do so without adding any significant amount of weight in comparison with the devices of the prior art.

Of course, the present invention is not in any way restricted to the embodiment described and depicted, which has been given simply by way of example.

The invention claimed is:
1. A nacelle rear assembly for a turbojet engine comprising:
   a cowl being located radially outside of a pod-shaped internal structure, said pod-shaped internal structure com- prising an upstream part and a downstream part which form together a fairing for a gas generator, wherein said downstream part of said pod-shaped internal structure is of an O-duct type and said downstream part is configured to slide in an axial direction between an operating position and a maintenance position situated downstream of said operating position, wherein in the operating position, the downstream part covers the gas generator of said turbojet engine and defines an annular cold air flow path with said cowl, wherein the downstream part of said pod-shaped internal structure is configured to be detached from said upstream part of said pod-shaped internal structure, and said upstream part comprises two doors configured to pivotably open outward, wherein an inside diameter of an upstream edge of said downstream part is greater than a largest diameter of said gas generator, so that said downstream part of said pod-shaped internal structure is configured to slide without blockage in relation to said gas generator, and wherein said two doors comprise a cutout configured to engage with a complementary protrusion formed on said upstream edge of said downstream part, and said two doors are configured to be connected to said downstream part by at least two catches, wherein one of said at least two catches is interposed between one of said two doors and said downstream part, and another of said at least two catches is interposed between the other of said two doors and said downstream part.

2. The assembly as claimed in claim 1, wherein said two doors are configured to open by pivoting about axes substantially parallel to said axial direction.

3. The assembly as claimed in claim 1, wherein said two doors are configured to slide in said axial direction.

4. The assembly as claimed in claim 1, wherein said cowl is mounted to slide axially between the operating and maintenance positions, wherein the assembly comprises catches providing a connection between said two doors, actuating handles of which are long enough to block the return of said cowl from the maintenance position to the operating position as long as the handles are not folded down into a locked position.

5. The assembly as claimed in claim 1, further comprising a forward frame able to be connected to a fan casing of said turbojet engine, said forward frame at least partially covering said two doors when said pod-shaped internal structure is in the operating position.

6. The assembly as claimed in claim 5, wherein said forward frame is structural to said nacelle.

7. The assembly as claimed in claim 1, further comprising thrust reversal means.

8. The assembly as claimed in claim 7, wherein said thrust reversal means comprise shutters pivot-mounted on said cowl, and links interposed between said shutters and said downstream part of the pod-shaped internal structure so that a translational movement of said cowl in the downstream direction causes said shutters to close off said cold air flow path and to deflect the cold air stream toward the outside of the nacelle.

9. An airplane nacelle, comprising the assembly as claimed in claim 1.

* * * * *